United States Patent
Yahaba et al.

(10) Patent No.: US 8,157,943 B2
(45) Date of Patent: Apr. 17, 2012

(54) METHOD FOR PRODUCING HEMMED JOINT STRUCTURE

(75) Inventors: Takanori Yahaba, Saitama (JP);
Kenichi Tanoguchi, Saitama (JP);
Tsutomu Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 12/138,886

(22) Filed: Jun. 13, 2008

(65) Prior Publication Data

US 2008/0308217 A1   Dec. 18, 2008

(30) Foreign Application Priority Data

Jun. 15, 2007   (JP) ................................ P2007-158823

(51) Int. Cl.
*B32B 37/00*   (2006.01)
(52) U.S. Cl. ........................................ 156/212; 156/196
(58) Field of Classification Search .................. 156/196, 156/212

See application file for complete search history.

(56) References Cited

U.S. PATENT DOCUMENTS

| | | | | |
|---|---|---|---|---|
| 5,451,742 A | * | 9/1995 | Nishio et al. ............. | 219/121.64 |
| 5,548,026 A | * | 8/1996 | Jorissen et al. ............... | 525/113 |
| 2002/0014544 A1 | * | 2/2002 | Holmstrom ................... | 239/597 |
| 2008/0000071 A1 | * | 1/2008 | Chen et al. ...................... | 29/509 |

FOREIGN PATENT DOCUMENTS

| | | | | |
|---|---|---|---|---|
| JP | 57207656 A | * | 12/1982 | |
| JP | 1-202383 A | | 8/1989 | |
| JP | 6-285659 A | | 10/1994 | |
| JP | 7-75888 A | | 3/1995 | |
| JP | 2000-264272 A | | 9/2000 | |
| JP | 2003-275876 A | | 9/2003 | |
| JP | 2005-534499 A | | 11/2005 | |
| JP | 2007-98439 A | | 4/2007 | |
| JP | 2007185690 A | * | 7/2007 | |
| WO | WO 2004/014593 A1 | | 2/2004 | |

* cited by examiner

*Primary Examiner* — Jeff Aftergut
*Assistant Examiner* — Jaeyun Lee
(74) *Attorney, Agent, or Firm* — Arent Fox, LLP

(57) ABSTRACT

A method for producing a hemmed joint structure having a second member placed on a first member and an edge of the first member bent over the second member to join the two members with each other. In this method, there is provided an flange part jutting out from an edge of the first member. The flange part is disposed at a position where the flange part, when bent, does not overlap an adhesive layer between the first member and the second member. Since the adhesive layer is set apart from the flange part, even when the flange part is subjected to friction stir bonding, the resultant frictional heat will not affect the adhesive layer.

2 Claims, 6 Drawing Sheets

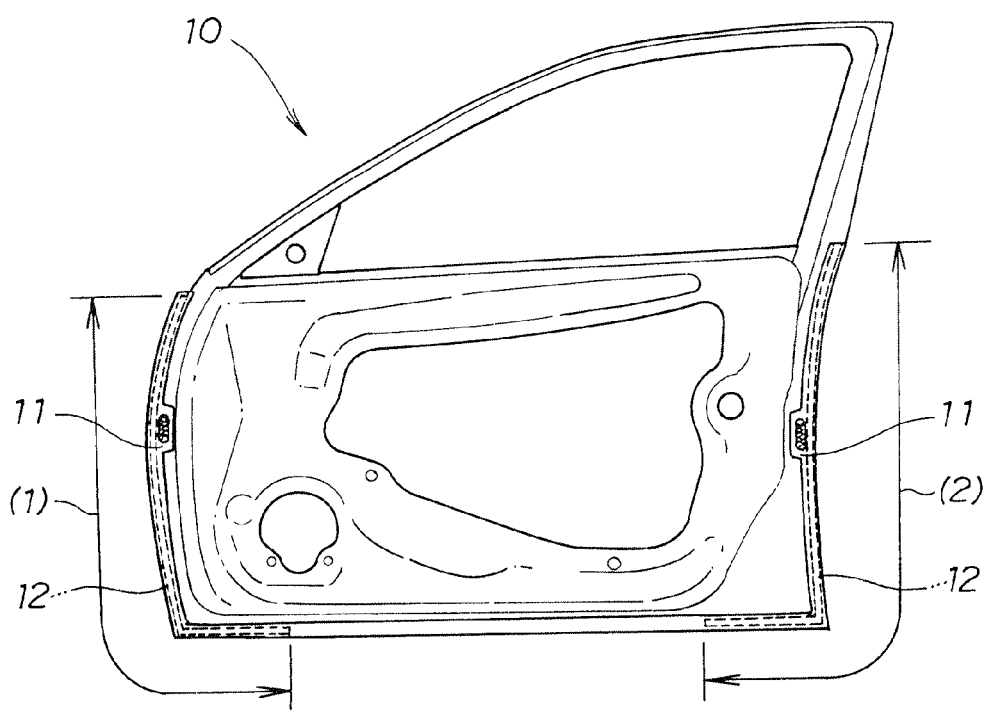

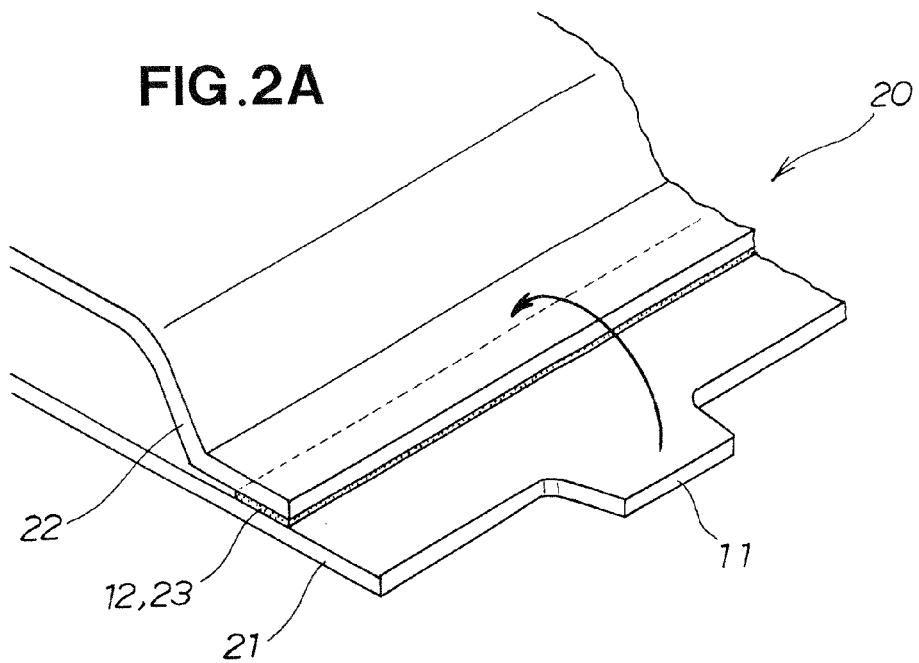
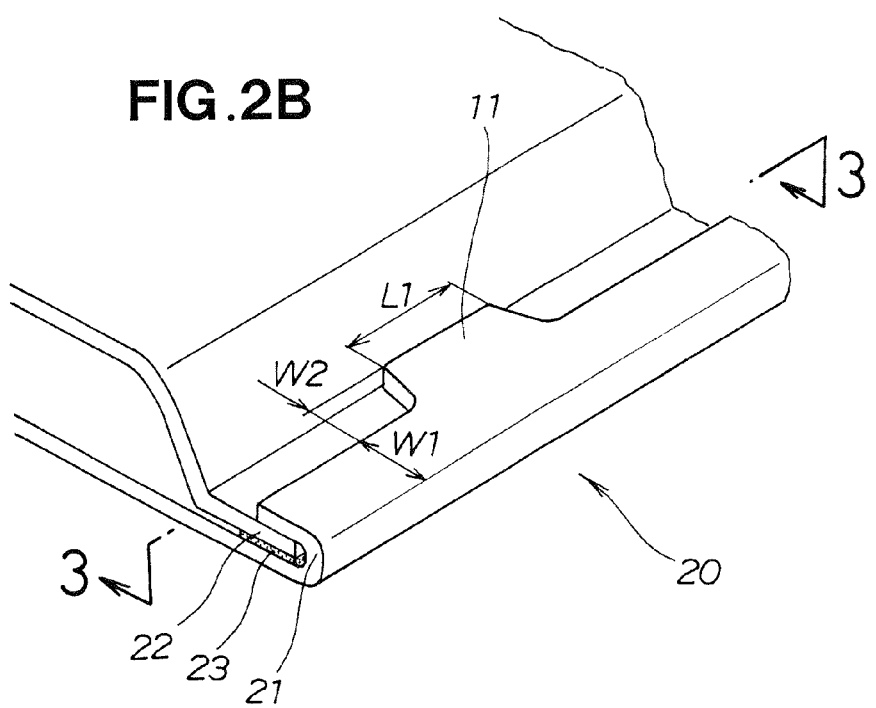

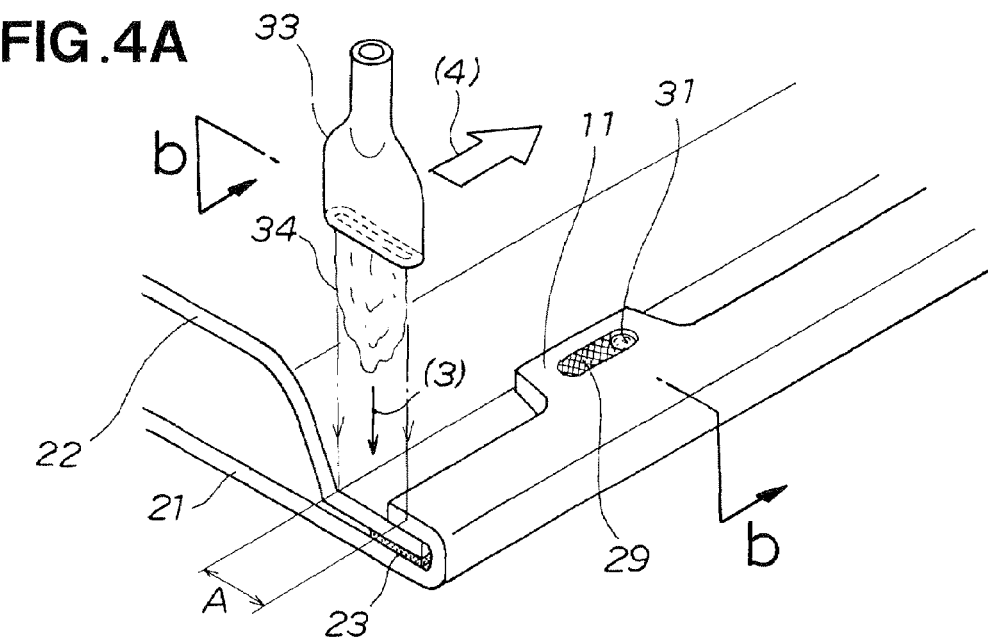
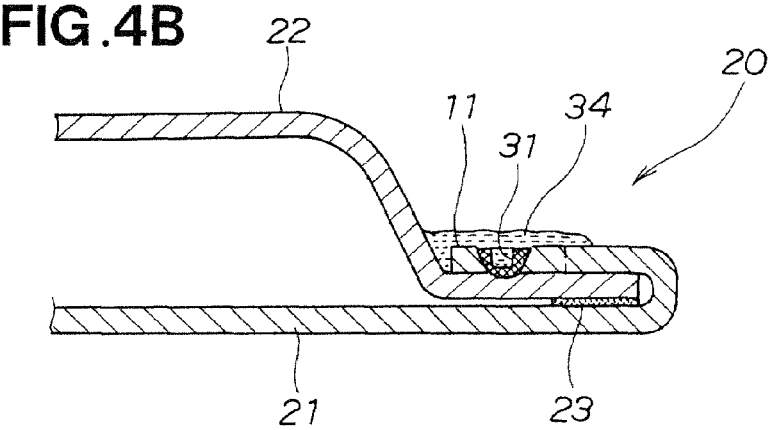

METHOD FOR PRODUCING HEMMED JOINT STRUCTURE

FIELD OF THE INVENTION

The present invention relates to a method for producing a hemmed joint structure for bonding or joining together an aluminum-based member and an iron-based member.

BACKGROUND OF THE INVENTION

There are occasions where two members, namely, one made of an aluminum-based material and the other made of an iron-based material, need to be joined together. Such members are regarded to be difficult to bond together because the melting point of aluminum greatly differs from that of iron while an aluminum oxide film that covers the aluminum-based member is so hard that welding is difficult to perform.

To address the problem, it is known to apply friction stir bonding as disclosed, for example, in Japanese Patent Application Laid-Open Publication No. 2007-30043 (JP 2007-30043 A).

The friction stir bonding disclosed in JP 2007-30043 A will be described below with reference to FIGS. 5A to 5C hereof. FIG. 5B is a cross-sectional view taken along line b-b of FIG. 5A while FIG. 5C is a cross-sectional view taken along line c-c of FIG. 5A.

As shown in FIG. 5A, an adhesive 102 is applied onto a flat plate 101, on which an angled member 103 is placed. Friction stir bonding is used to melt and bond the angled member 103 with the flat plate 101 to form a bonded structure 104.

The principle of friction stir bonding is described as follows: when a spindle rotating at a high speed is pressed against the angled member 103, the frictional heat generated by the rotation melts part of the angled member 103 and the flat plate 101. The melted portion moves as the spindle is moved along the angled member 103, and solidifies as the spindle moves away.

As shown in FIG. 5B, a welded portion 106 is formed, which serves to join the flat plate 101 with the angled member 103. The adhesive 102 is not particularly heat-resistant, and accordingly burns away on being subjected to the frictional heat in the vicinity of the welded portion 106.

As shown in FIG. 5C, a recess 107, referred to as a stop mark, is left at an end of the welded portion 106. The recess 107 is created when the spindle is withdrawn.

Cases shall be considered hereunder in regard to the friction stir bonding described above being applied to production of a door and a hood skin of a vehicle and other lid-shaped objects.

FIGS. 6A and 6B are descriptive views showing friction stir bonding being used to produce a lid-shaped object.

As shown in FIG. 6A, an adhesive is applied onto a first member 111 made of an aluminum-based material to form adhesive layers 112, 112, on which a second member 113 made of an iron-based material is overlaid. The edge of the first member 111 is then bent over the second member 113, as indicated by the arrow.

As shown in FIG. 6B, friction stir bonding is then used to create a welded portion 114 so as to bond the first member 111 with the second member 113. The bond formed using the adhesive 112 and the bond formed using the welded portion 114 can firmly join the second member 113 with the first member 111.

As shown in FIG. 6A, the adhesive layers 112, 112 are desirably applied in a non-continuous manner to avoid being affected by the frictional heat. However, non-continuous application is a more cumbersome task than continuous application and takes a longer period of time, resulting in an increased adhesive application cost.

Further, as shown in FIG. 6B, since a recess 115, referred to as a stop mark, is inevitably left, the recess 115 must be filled with a putty or other materials. Specifically, an extra step of filling the stop mark must be added, resulting in an increased cost of producing a lid-shaped object.

SUMMARY OF THE INVENTION

It is therefore an object of the present invention to provide a method for producing a hemmed joint structure, wherein an adhesive can be continuously applied and no separate task of filling a stop mark is required.

According to an aspect of the invention, there is provided a method for producing a hemmed joint structure having a second member made of an iron-based material placed on a first member made of an aluminum-based material, and an edge of the first member bent over the second member to join the two members with each other; the method comprising the steps of: providing an flange part jutting out from part of an edge of the first member; adhesively bonding an edge of the second member to the first member using an adhesive layer of a room-temperature-curing adhesive; bending the edge of the first member over the second member so that the flange part does not overlap the adhesive layer; melting and bonding the flange part to the second member by friction stir bonding; and applying a sealant to a gap between a front edge of the bent first member and the second member as well as to an upper side of the flange part.

According to the method of the invention, as described above, the first member is thus provided with the flange part. The flange part is provided to a position where the flange part, when bent, does not overlap the adhesive layer. Since the adhesive layer is situated apart from the flange part, even when the flange part undergoes friction stir bonding, the resultant frictional heat does not affect the adhesive layer. As a result, the adhesive does not need to be applied non-continuously, and indeed can be applied continuously.

Further, a sealant has conventionally been applied in the gap between the front edge of the bent first member and the second member in order to prevent the ingress of water. Since the flange part is located in the area where the sealant is applied, the sealant is also applied onto the upper side of the flange part in the step of applying the sealant. As a result, a spot end left in the flange part is filled with the sealant.

According to the method of the invention, it is thus possible to provide a method for producing a hemmed joint structure, the method being characterized in that an adhesive can be continuously applied and no separate task of filling a stop mark is required.

The room-temperature-curing adhesive is a two-component structural adhesive obtained by mixing a primary agent and a curing agent immediately before use. In general, a one-component structural adhesive is not a room-temperature-curing adhesive but a heat curing adhesive. A heat curing adhesive requires heating, which could deform the first and second members. To address the problem, a room-temperature-curing adhesive is required. A room-temperature-curing one-component structural adhesive is, however, a special product and hence is not readily available. Such an adhesive is also expensive. In this regard, a two-component structural adhesive is, in general, a room-temperature-curing adhesive, readily available, and inexpensive.

BRIEF DESCRIPTION OF THE DRAWINGS

A preferred embodiment of the invention will be described in detail below, by way of example only, with reference to the accompanying drawings, in which:

FIG. 1 is a front view of a vehicle door to which a production method of the present invention is applied;

FIGS. 2A and 2B illustrate a step of providing an flange part and a step of bending a first member;

FIGS. 4A and 4B illustrate a step of applying a sealant;

DETAILED DESCRIPTION OF THE PREFERRED EMBODIMENT

Figure 3A:
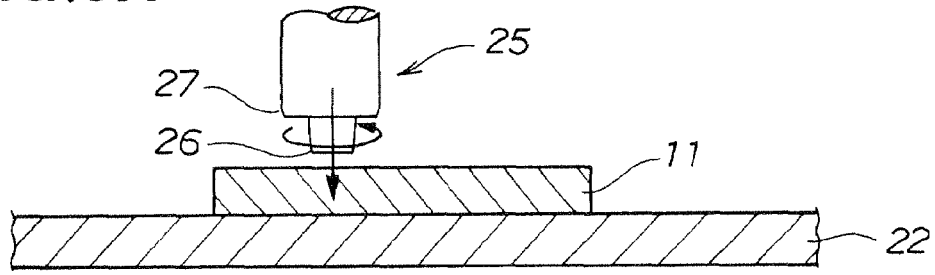
FIGS. 3A to 3D are cross-sectional views taken along line 3-3 of FIG. 2B, showing friction stir bonding.

As shown in FIG. 1, a vehicle door 10, which is a typical example of a lid-shaped object, is provided with flange parts 11, 11 at the front edge where a hinge is provided and the rear edge where a door lock is provided, because the front and rear edges need to be more rigid than other portions. Adhesive layers 12, 12 are continuously applied to the portions indicated by arrows (1) and (2) along the flange parts 11, 11.

A method for producing a hemmed structure will be described below primarily with reference to the flange part 11.

FIGS. 2A and 2B show the step of providing the flange part and the step of bending a first member.

As shown in FIG. 2A, when producing a hemmed joint structure 20 in which a second member 22 made of an iron-based material is placed on a first member 21 made of an aluminum-based material and an edge of the first member 21 is bent over the second member 22 to join the two members 21 and 22 with each other, the flange part 11 jutting out from part of the edge of the first member 21 is provided.

The first member 21, when punched out or otherwise cut out from a blank plate, usually has the flange part 11 integrated therewith in advance. Alternatively, the flange part 11 may be welded to the first member 21 after the cutting process. In essence, the flange part 11 may be formed at any point of time as long as the flange part 11 has been formed integrally with the first member 21 before the edge of the first member 21 is bent.

An adhesive 12 is continuously applied onto the first member 21 with the flange part 11. The adhesive 12 is a room-temperature-curing adhesive (such as a room-temperature-curing epoxy-based adhesive). Specifically, a room-temperature-curing adhesive is desirably a two-component structural adhesive obtained by mixing a primary agent and a curing agent immediately before use. In general, a two-component structural adhesive is a room-temperature-curing adhesive, and readily available at an inexpensive price. A structural adhesive is an adhesive defined in "Glossary of Terms Used in Adhesives and Adhesion" (JIS S K 6800) as "a reliable adhesive whose bonding characteristics tend not to decline even when a large amount of load is applied for an extended period of time."

The second member 22 is placed on the adhesive 12. The adhesive 12, on curing, becomes an adhesive layer 23. The second member 22 is bonded with the first member 21 with the adhesive layer 23 therebetween. The adhesive layer 23 reacts at room temperature and the curing process takes place.

The flange part 11 and the edge of the first member 21 are bent over the second member 22 as indicated by the arrow.

The structure shown in FIG. 2B is thus obtained. For example, the thickness of the first member 21 is 1.2 mm and the length of the overlapping portion W1 thereof is 13 m; the length of the projecting portion W2 of the flange part 11 is 8 mm, and the length L1 thereof is 40 mm.

FIGS. 3A to 3D show friction stir bonding.

Figure 3B:
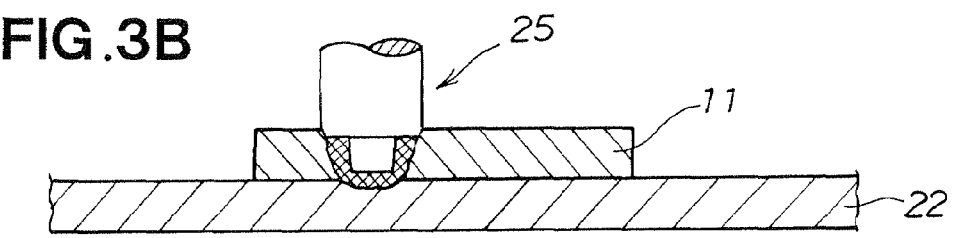

As shown in FIG. 3A, a spindle 25 is set to face the flange part 11. The spindle 25, for example, includes a 3-mm-diameter pin 26 and a 10-mm-diameter shoulder 27, and is caused to rotate at a speed of 2000 revolutions per minute. When the pin 26 comes into contact with the flange part 11, the frictional heat generated by the rotation melts part of the flange part 11, and subsequently melts part of the second member 22 as well as the flange part 11, as shown in FIG. 3B.

Figure 3C:
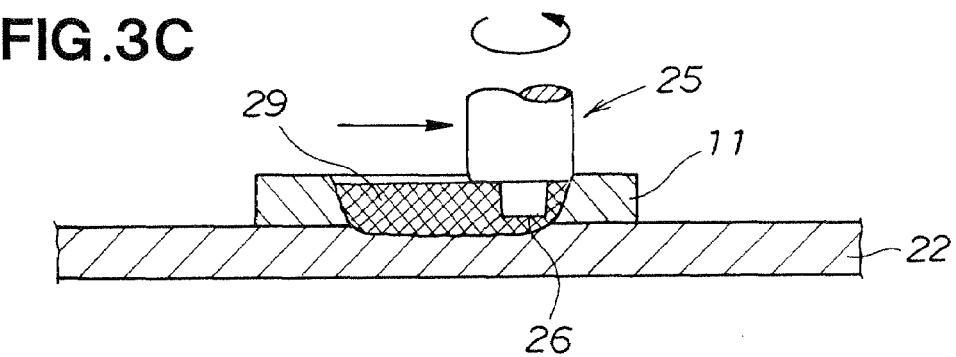

As shown in FIG. 3C, the spindle 25 is then moved at a speed of 1000 mm per minute. New melted metal portions are successively created. Meanwhile, the old melted metal portions situated adequately away from the pin 26 solidify into melted metal portions 29.

Figure 3D:
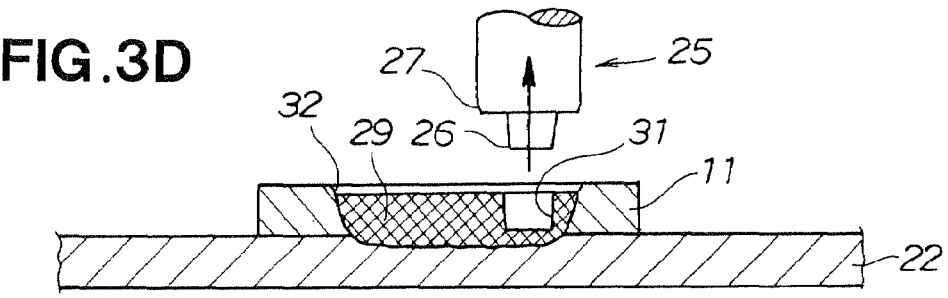
Figure 5A:
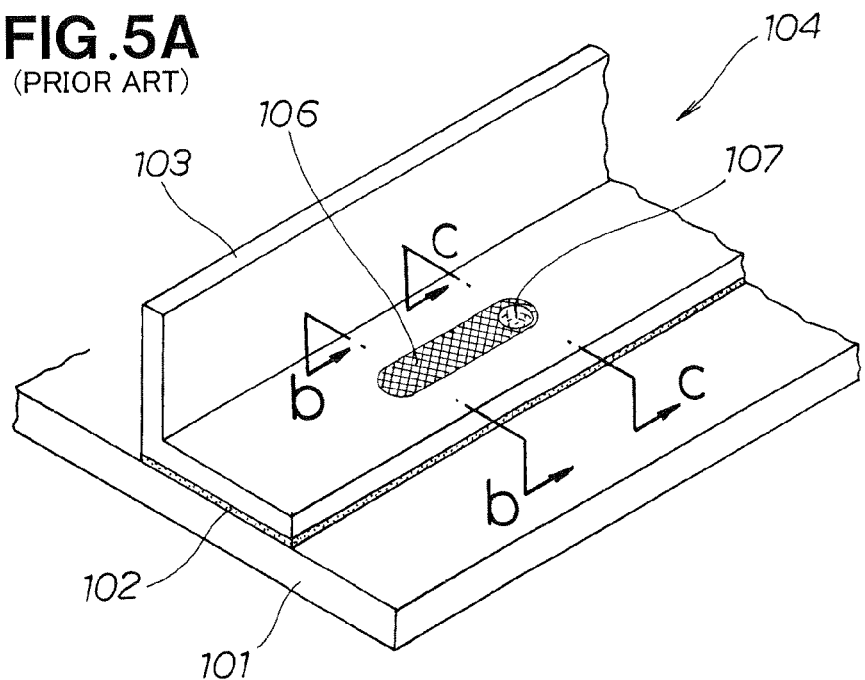
FIGS. 5A to 5C illustrate conventional friction stir bonding.
Figure 5B:
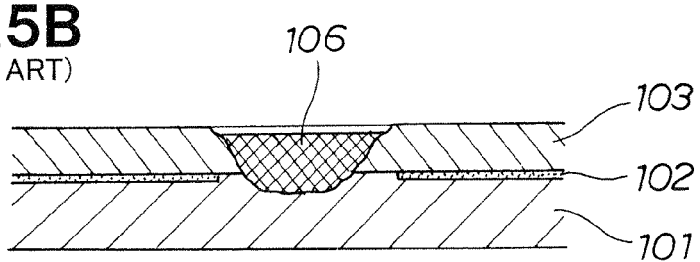
Figure 5C:
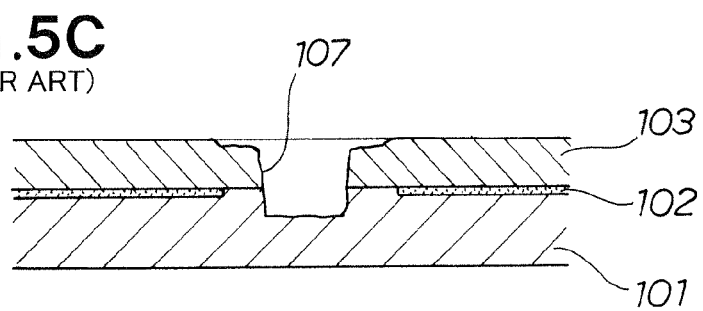
Figure 6A:
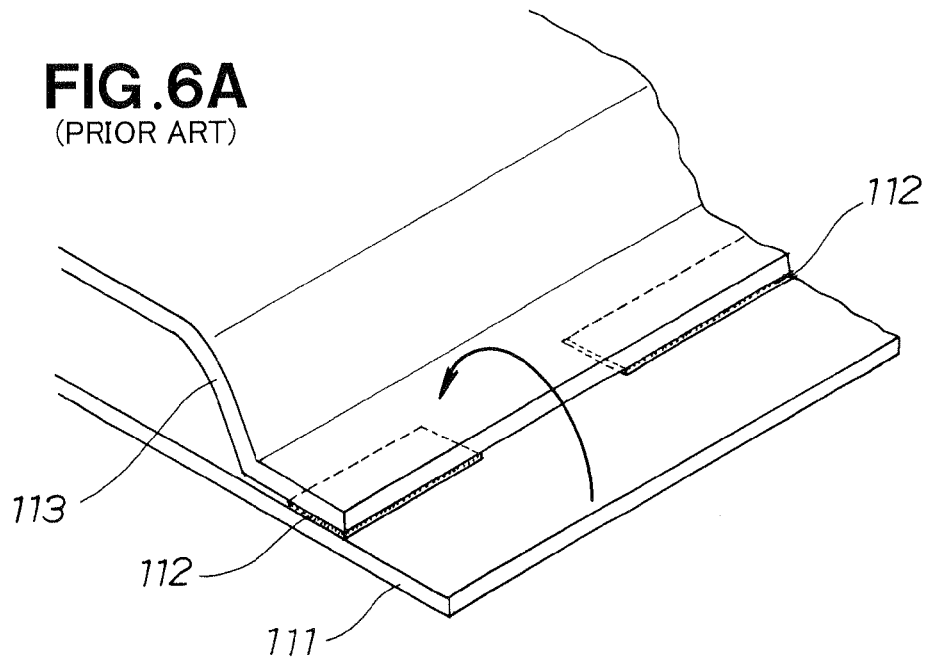
FIGS. 6A and 6B are schematic perspective views illustrating the conventional friction stir bonding applied to the production of a lid-shaped object.
Figure 6B:
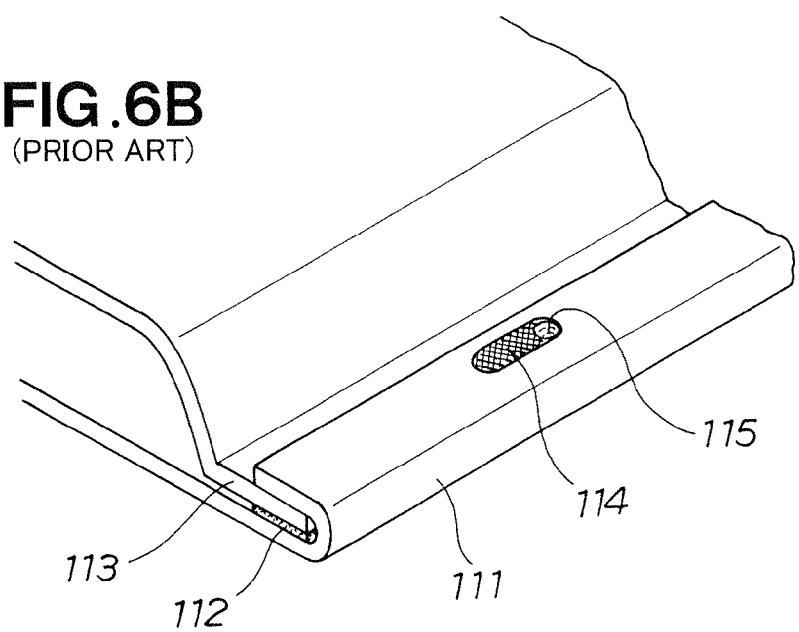

As shown in FIG. 3D, the spindle 25, on reaching an end point, is withdrawn from the flange part 11. As a result, a recess 31, referred to as an end mark, is left in the flange part 11. The remaining portion of the flange part 11 becomes the melted metal portion 29, which joins the flange part 11 with the second member 22. Reference numeral 32 denotes a shallow indentation created by the shoulder 27.

FIGS. 4A and 4B show the step of applying a sealant.

As shown in FIG. 4A, to block the gap between the front edge of the bent first member 21 and the second member 22, a sealant applying gun 33 is lowered as indicated by arrow (3), and then moved as indicated by arrow (4). Since the flange part 11 is located in a sealant application area A, a sealant 34 flows into the recess 31.

As shown in FIG. 4B, the sealant 34 that blocks the gap between the front edge of the bent first member 21 and the second member 22 can also fill the recess 31. The hemmed joint structure 20 of the invention is thus completed.

The sealant 34 is preferably a gap-filling material, called a dust sealer. The gap-filling material is a viscous liquid during the filling process, but changes with time into an elastic solid.

As is apparent from FIG. 4B, since the adhesive layer 23 is set apart from the flange part 11, even when the flange part 11 is subjected to friction stir bonding, the frictional heat does not affect the adhesive layer 23. As a result, the adhesive can be continuously applied in a direction that is perpendicular to the plane of the drawing, which vastly simplifies the adhesive application operation and reduces the application cost.

The method for producing a hemmed joint structure according to the invention can be applied to a variety of lid-shaped objects formed from an aluminum-based material and an iron-based material overlaid on each other and joined with each other by being bent at an edge. The method can be used with a door, a hood, a lid, and any other object.

The invention is preferably applied in particular to a process of bending an edge of a vehicle door formed from an outer panel made of an aluminum-based material and an inner panel made of an iron-based material.

What is claimed is:

1. A method for producing a hemmed joint structure having a second member made of an iron-based material placed on a first member made of an aluminum-based material, and an edge portion of the first member bent over the second member to join the two members with each other, the method comprising the steps of:

providing a flange part jutting out from part of an edge of the first member, the first member having an edge portion provided with the flange part;

applying a room-temperature-curing adhesive to the first member continuously along the edge portion of the first member such that the applied adhesive forms a continuous adhesive layer extending parallel to the edge portion of the first member and separated by the edge portion of the first member from the flange part;

placing an edge portion of the second member on the adhesive layer and allowing the adhesive to cure at room temperature, thereby adhesively bonding the edge portion of the second member to the first member using the adhesive layer of the room-temperature-curing adhesive;

bending the edge of the first member over the adhesively bonded edge portion of the second member such that the flange part of the first member does not overlap the adhesive layer;

fusion-bonding the flange part to the second member by friction stir bonding while the adhesive layer is maintained without damage due to friction heat produced during the friction stir bonding, wherein a recess is formed in an upper side of the flange part; and applying a sealant to a gap between a front edge of the bent first member and the second member as well as to the upper side of the flange part to fill the recess.

2. The production method of claim 1, wherein the room-temperature-curing adhesive is a two-component structural adhesive obtained by mixing a primary agent and a curing agent immediately before use.

* * * * *